Dec. 15, 1942.  J. M. HOTHERSALL  2,304,824
ART OF MAKING CONTAINER BODIES
Filed April 18, 1940   3 Sheets-Sheet 1
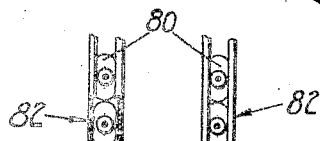
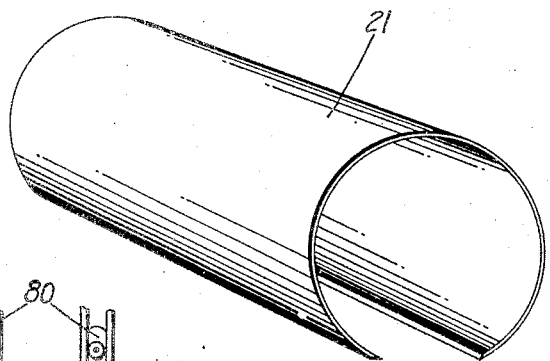
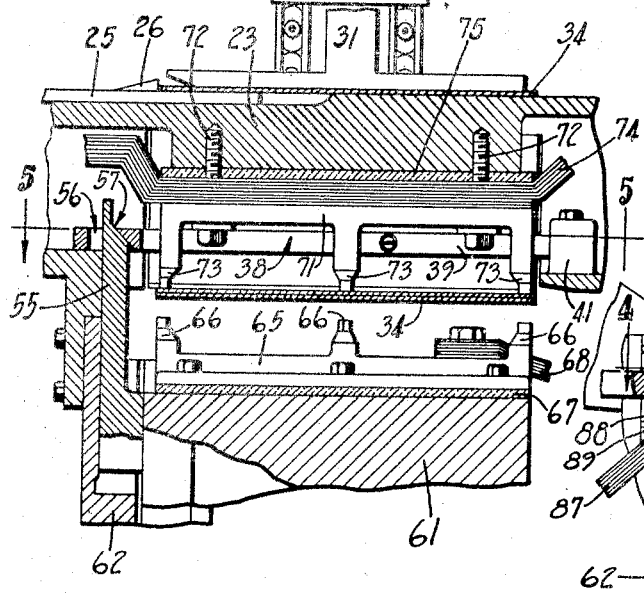
INVENTOR
John M. Hothersall
BY
ATTORNEYS

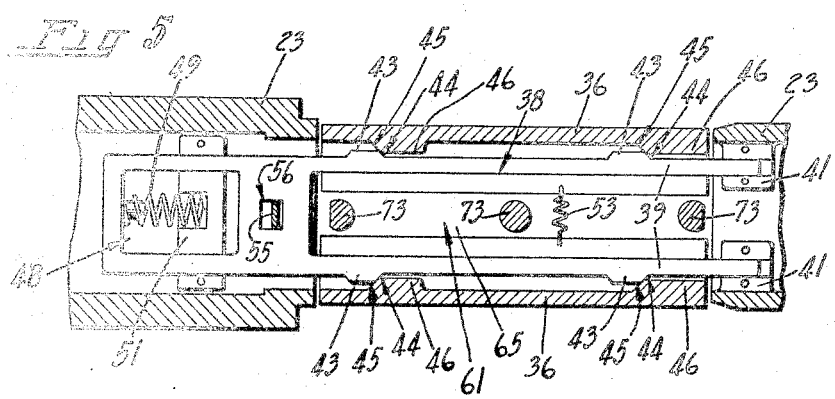
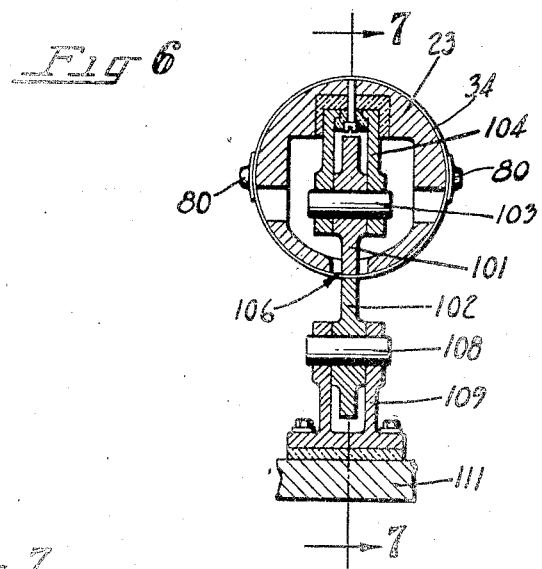
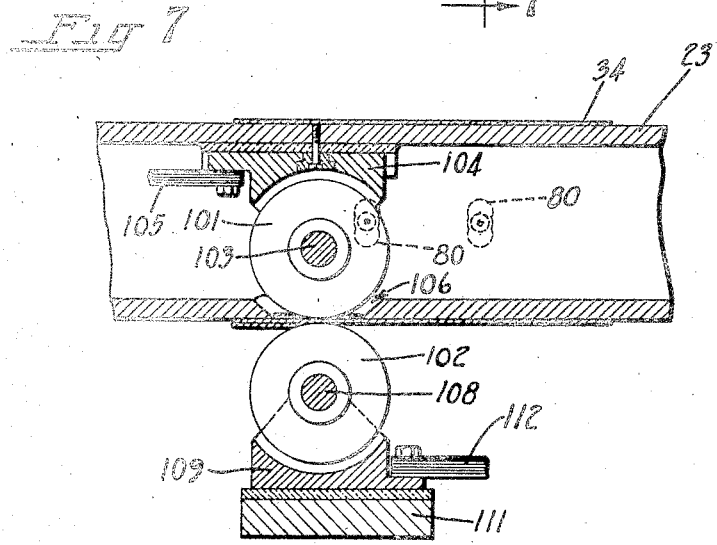

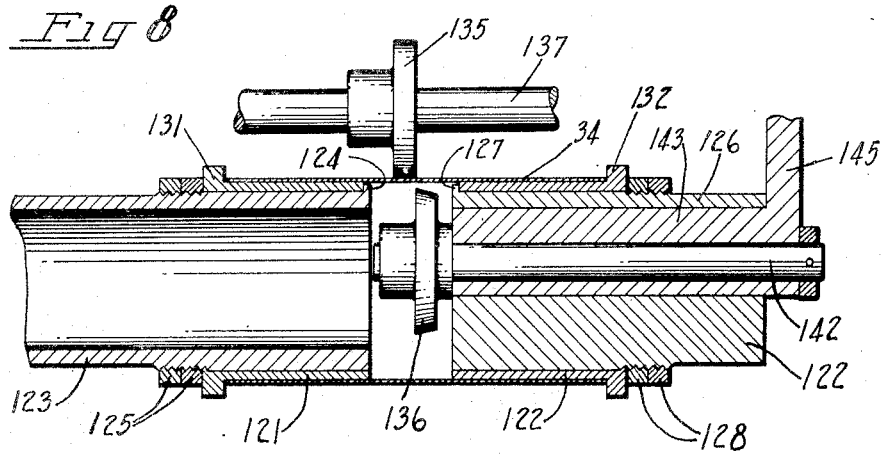
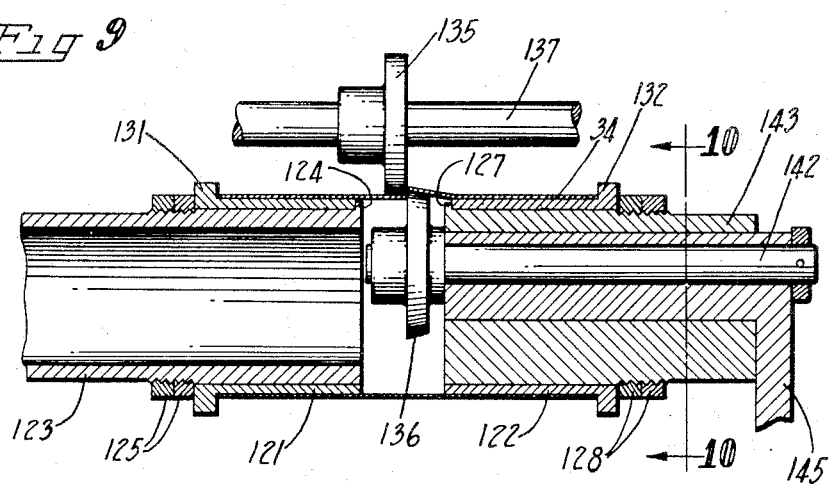
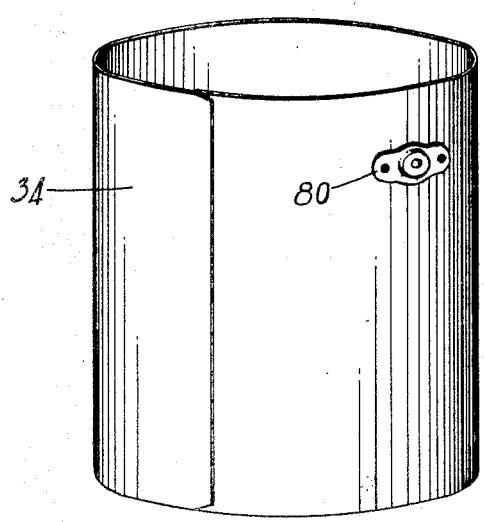
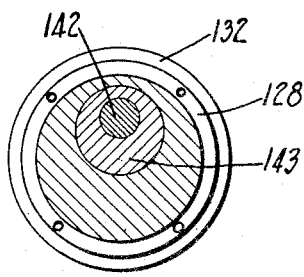

Patented Dec. 15, 1942

2,304,824

UNITED STATES PATENT OFFICE 2,304,824

ART OF MAKING CONTAINER BODIES

John M. Hothersall, Brooklyn, N. Y., assignor to American Can Company, New York, N. Y., a corporation of New Jersey Application April 18, 1940, Serial No. 330,416

4 Claims. (Cl. 113—120)

The present invention relates to a method of making container bodies and has particular reference to making container bodies with welded bail ears attached to them. This is an improvement over the method disclosed in my United States Patent 2,056,192, issued October 6, 1936, on the Art of making container bodies.

In this patent there is disclosed a method of producing container bodies in a simple and effective manner as by forming a double length tubular body section and splitting this tubular section in two parts to form two independent container bodies. The instant invention contemplates the production of such container bodies with bail ears attached to them.

An object of the invention is the provision of a method of forming a double length tubular container body, attaching a double set of bail ears in the proper place to the double body so formed, prior to dividing or severing the double body transversely into two parts to produce two independent container bodies each having bail ears in proper position thereon.

Another object is the provision of such a method wherein the bail ears are welded in place on the container body.

Numerous other objects and advantages of the invention will be apparent as it is better understood from the following description, which, taken in connection with the accompanying drawings, discloses a preferred embodiment thereof.

Referring to the drawings:

Figure 1 is a perspective view of a tubular shaped blank from which two independent container bodies are to be formed in accordance with the steps of the instant method invention;

Fig. 2 is a schematic sectional view of an apparatus showing the tubular shaped blank in Fig. 1 on a mandrel with its edges overlapped and also showing devices for feeding bail ears into place adjacent the blank and devices for welding the ears to the blank and for tacking the overlapped edges of the blank together;

Fig. 3 is a transverse fragmentary view of the same features taken substantially along the line 3—3 in Fig. 2;

Fig. 4 is a horizontal sectional view taken through a pair of the bail ear welding electrodes as substantially along the line 4—4 in Fig. 2;

Fig. 5 is a horizontal sectional view taken substantially along the line 5—5 in Fig. 3;

Fig. 6 is a schematic view illustrating the same or a different mandrel in cross section and showing welding rollers for forming a continuous side seam in the body while on the mandrel;

Fig. 7 is a sectional view taken substantially along the line 7—7 in Fig. 6;

Figs. 8 and 9 are schematic longitudinal sectional views taken through cutting heads and respectively illustrating two cutting stages in the splitting of a tubular body into two container bodies;

Fig. 10 is a cross sectional detail taken substantially along the line 10—10 in Fig. 9; and Fig. 11 is a perspective view of one of the finished can bodies as produced by the various steps of operation.

A double length body sheet or blank 21 (Fig. 1) having a potential area for two container bodies is the raw material for the container bodies to be made. This blank is preferably in tubular form as shown in the drawing, the forming of the blank being done in any suitable manner such as in my patent hereinbefore mentioned.

The tubular blank 21 is first placed upon a mandrel 23 which may be a part of a suitable machine for carrying out the steps of the instant invention. The blank is located on the mandrel with its longitudinal edges disposed adjacent to the bottom of the mandrel. While in such relative position, the blank is moved along the mandrel in any suitable manner as by a feed bar 25 (Fig. 3) having depressible spring pressed dogs 26. It is brought to rest at a body sizing station, shown in Figs. 2 and 3, and is still on the mandrel.

At the body sizing station the tubular blank 21 is first clamped to the mandrel along its top by a holding head 31 which may be of the usual form used in body makers. Side wings 32 are then moved inwardly against the sides of the tubular blank and the latter is wrapper close around the mandrel with the longitudinal edges of the blank brought together, converting the tubular form blank 21 into a double tubular body 34. The mandrel is provided with inner side wings or sizing walls 36 formed with rounded heads which are hinged at the upper ends in sockets or pockets 37 formed in the mandrel.

Before the side wings 32 have completed the wrapping of the body around the mandrel just described, the sizing walls 36 are moved outwardly to properly shape the mandrel to its desired cross section. This section sizes the body 34 and brings it into a predetermined diameter.

Movement of the side wings may be effected in any suitable manner as by a sliding plate 38 (Figs. 2, 3 and 5) which moves inside and longitudinally of the mandrel 23. The plate is forked at its forward end into two arms 39 which are slidingly supported in blocks 41 carried in the mandrel. Each arm 39 is provided with outer extensions 43 having tapered faces 44 at their forward edges. These faces are adapted to slide against tapered faces 45 formed in projections 46 extending inwardly from the walls 36.

The rear end of the slide 38 is cut away at 48 and a spring 49 is located within the opening, being interposed between the end of the slide and a stationary block 51 carried in the mandrel 23. This spring when not compressed holds the slide in retracted position with the mandrel walls 36 collapsed. When the mandrel walls 36 are fully sized as just referred to, the slide 38 is in forward position and the projections 43 are inside of the projections 46 of the walls 36. The mandrel walls may be yieldingly tied together near their bottom free edges by a spring 53 which insures their collapse when the plate 38 is slid back to disengage its projections 43 from the wall projections 46.

Movement of the slide 38 to effect this sizing action is made by a vertically movable plate 55 which extends upwardly through an opening 56 formed in the slide. The plate 55 is formed with an inclined wall 57 which engages with a similar wall at one end of the opening 56. Upward movement of the plate is transmitted through the inclined surfaces and this moves the slide forward and then locks the slide and the mandrel walls 36 in sizing position.

Provision is made for tacking together and in separated spots, the overlapped edges of the container body 34 so that its sized diameter will be maintained when the body is moved from the sizing station. For this purpose there is disclosed in the drawings (Figs. 2, 3 and 5) a welding head 61 which is disposed below the mandrel 23 and which slides vertically in a slideway formed on a face of the machine frame, as indicated by the numeral 62. The slide may be moved in any suitable manner such as by a link 63 which is a usual construction in container body makers.

An electrode unit 65 having a plurality of upwardly extending electrodes 66 spaced at intervals along its length is carried on top of the welding head 61 and is insulated therefrom in any suitable manner as by an insulating plate 67. These electrodes constitute the lower electrodes of the tacking apparatus and receive electric welding energy by way of a flexible bus bar 68 which leads to any suitable source of such energy.

With the lower electrode unit moves up into contact with the overlapped side seam edges of the container body 34, it presses these edges into engagement with a cooperating upper electrode unit 71 which is located within the mandrel and is secured in place by bolts 72. This upper electrode unit is formed with a plurality of depending electrodes 73 which are located in line with the lower electrodes 66. These upper electrodes receive electric welding energy from a bus bar 74 which leads from the source of energy mentioned. The bar and the electrodes are insulated from the mandrel by an insulating plate 75.

At the same time that this side seam tacking operation is taking place the bail ears hereinbefore mentioned and indicated by the numeral 80 (Figs. 2 and 3) are being attached to the sized container body 34. These bail ears are preferably delivered into proper position adjacent the container body at a predetermined distance from the end of the body by way of chutes or runways 82. There are preferably four of these runways, two on each side of the body and each pair is spaced the proper distance apart to accurately locate the ears relative to the ends of the potential bodies to be later obtained. These runways terminate in a horizontal plane which extends through the middle of the sized double body so that the lowermost ears in the chutes may be attached to the body in diametrically opposed positions.

Adjacent the terminal ends of the runways on each side of the body mandrel there is disposed an ear electrode unit 85 (Figs. 2 and 4) having a pair of vertically spaced electrodes 86 which are in line with the top and bottom of the flange part of the lowermost ear in each runway. These electrodes constitute the outer ear electrodes and receive electric welding energy from the source hereinbefore mentioned as by way of flexible bus bars 87.

The ear electrode units 85 are carried in and are insulated from horizontal slides 88 which operate in slideways 89 formed in the machine frame 62. The slides may be operated in any suitable manner in time with the other moving parts of the machine. Hence when the slides move toward the mandrel 23 the outer ear electrodes 86 engage the flange part of the lowermost bail ear 80 in all the runways 82 and press them against the container body 34 for the ear welding operation.

These outer ear electrodes 86 cooperate with a similar set of inner ear electrodes 91 which are formed on an inner electrode unit 92 disposed inside the mandrel. This unit is carried on an insulating block 93 which is secured in the sizing walls 36. The electrodes receive electric welding energy from the inner tacking electrode unit 71 by way of wires 94 which connect these members.

Contact of the outer ear electrodes 86 with the inner ear electrodes 91 through the bail ear and the container body interposed between them completes the welding circuit and thus welds the ears to the container body. In this welding operation there are four bail ears secured in their proper places to the double length body so that when the body is subsequently divided into two separate bodies each of these separate bodies will have its required two bail ears located in the proper place.

After this bail ear welding operation the tacked container body is released by contraction of the sizing wings 32, 36 and is thereupon advanced along the mandrel for further operations. As the container body moves out of the tacking station the ears secured to the body leave the runways by way of openings 96 formed in the sides thereof.

Since the rear-most bail ear on each side of the body must pass through the foremost runway as the body moves along the mandrel, provision is made to prevent the next above bail ears in the runways from immediately falling down to their place in the bottom of the chutes before the ears which are welded to container body are entirely clear of the chutes. This is brought about by movable holding fingers 97 which are pivoted on lugs 98 which extend up from the machine frame 62.

The lower ends of these holding fingers 97 are formed with hook sections which engage under the bail ear next above the lowermost one in the chutes and thereby hold up the entire stack until released by withdrawal of the finger. Actuation of the finger at the proper time, as when a subsequent container body is brought into the tacking station, may be effected in any suitable manner in time with the other moving parts of the machine.

The tacked container body 34 is advanced into a side seam welding station (Figs. 6 and 7) where the overlapped and tacked edges of the body are further welded together in a tight side seam. This welding operation may be effected while the body is on the mandrel 23 or may take place on a separate or continuing mandrel if desired. The welding is preferably done while the overlapped side seam edges of the body are advanced between a pair of roller electrodes 101, 102.

Roller 101 is disposed inside the mandrel and is rotatably mounted on a pin 103 carried in a bracket 104 secured to and insulated from the mandrel. Electric welding energy is transmitted to the electrode by way of a bus bar 105 which extends through the middle of the mandrel. An opening 106 in the mandrel and through which the electrode extends, permits the electrode to engage the passing container body.

The electrode 102 is disposed below and outside the mandrel and in vertical alignment with the upper inner electrode. This outer electrode is mounted on a pin 108 carried in a bracket 109 secured to but insulated from a pad 111 which may be a part of the machine frame. The electrode receives electric welding energy by way of a bus bar 112 which is connected to the bracket 109. Rotation of these electrodes is effected by frictional contact with the moving container body which is fed forward in suitable manner.

The fully welded container body with its now continuous side seam is still a double body which requires only circumferential splitting or transverse severance at its center to produce the two desired container bodies. For this cutting operation the double body is positioned upon a pair of cutting heads 121, 122 (Figs. 8, 9 and 10).

The head 121 is mounted upon the end of a tubular member which is formed with an outwardly projecting flange 124 against which one end of the head 121 abuts. Locknuts 125 are threadedly engaged upon the tubular member 123 and hold the head 121 tightly against the projection.

The head 122 is mounted in a similar manner upon a member 126, the inner end of the head resting against a projecting flange 127. Locknuts 128 threadedly engaging the member 126 hold the head 122 in position against its flange projection 127.

The members 123, 126 are suitably mounted for rotation on a common axis and are movable longitudinally of that axis so that they may be separated one from the other a distance sufficient to allow positioning of the container body 34 on the heads 121, 122. When the body is in place on the heads its end edges engage against flanges 131, 132 formed on the respective heads thus clamping the body in position. It will be understood that the body 34, the heads 121, 122, and the members 123, 126 are all rotated in unison on a central longitudinal axis.

Cutting or transverse severance of the container body is preferably done by a pair of cooperating shear or slitter rollers 135, 136. Roller 135 is disposed outside the body on a shaft 137 which is parallel to the longitudinal axis of the rotating heads 121, 122. The shaft may be journaled in suitable bearings and may be rotated in any suitable manner. The roller engages the outside surface of the container body.

The cutting roller 136 is disposed inside the container body 34 between the ends of the heads 121, 122 and is mounted on a shaft 142 carried in an eccentric sleeve 143. The sleeve is eccentrically mounted in the rotating head member 126. The outer end of the sleeve is formed with an operating arm 145 so that the sleeve may be rotated relative to the head member as the latter rotates.

The normal position of the cutting roller 136 is as shown in Fig. 8 where it is out of contact with the container body. However, the resulting eccentric movement of the sleeve 143 when its arm is moved, shifts the cutting roller outwardly against the wall of the container body 34. The cooperative shearing action of both the rollers 135, 136 while the body rotates with the heads 121, 122, cuts through the wall of the container body and thus divides the double length body transversely into two independent and identical bodies. Fig. 11 shows such a body.

This cutting action takes place in the middle of the body and between the double set of bail ears 80 attached to the body as hereinbefore mentioned. Hence when the double length body is cut into two separate bodies each body carries its own set of two bail ears disposed on diametrically opposed sides of the body. This completes the making of the container bodies except for flanging the ends thereof. This flanging may be effected in the usual manner common to container making practice if such flanges are desired. In some cases where the end closures are affixed by welding, the flanges may or may not be desired.

It is thought that the invention and many of its attendant advantages will be understood from the foregoing description, and it will be apparent that various changes may be made in the steps of the method described and their order of accomplishment without departing from the spirit and scope of the invention or sacrificing all of its material advantages, the method hereinbefore described being merely a preferred embodiment thereof.

I claim:

1. The method of making a sheet metal tubular can body having a secured side seam and bail ears secured to opposite sides thereof, which comprises providing a can body blank wrapped around an expansible mandrel, positioning bail ears on opposite sides of the tubular body, expanding said mandrel to expand said body to align its meeting edges in a side seam and to register opposite portions of said body in engagement with the positioned ears, securing the aligned edges of the blank in a side seam to form a can body and securing said ears to opposite sides of said body by fusion of metal, each of said securing operations taking place while said body is maintained in the position to which it was expanded on the mandrel.

2. The method of making a sheet metal tubular can body having a welded side seam and bail ears welded to opposite side thereof, which comprises providing a can body blank wrapped around an expansible mandrel, positioning bail ears on opposite sides of the tubular body, expanding said mandrel to expand said body to align its meeting edges in a side seam and to register opposite portions of said body in engagement with the positioned ears, welding the side seam to form a can body and welding said ears to opposite sides of said body, each of said welding operations taking place while said body is maintained in the position to which it was expanded on the mandrel.

3. The method of making sheet metal tubular can bodies each having a welded side seam and bail ears welded to opposite sides thereof, which comprises successively advancing a plurality of can body blanks in tubular form having unsecured side seams along an expansible mandrel so an operating station, feeding a plurality of bail ears along separate predetermined paths into successive registry with diametrically opposed sides of said tubular blank at said station, expanding said mandrel at said station while a said tubular body is momentarily held at said station to expand the body and overlap its meeting edges in a side seam and to register diametrically opposed portions of said body in engagement with a pair of positioned ears at said station, and welding the lapped side seam to form a can body having a secured side seam while welding said positioned ears to opposite sides of said body, each of said side seam and ear welding operations taking place at said station while said body is maintained in the position to which it was expanded on the mandrel.

4. The method of making a tubular sheet metal can body member having an area of two potential can bodies and having a welded side seam and spaced pairs of bail ears welded to opposite sides thereof, comprising providing a double tubular can body blank wrapped around an expansible mandrel, positioning spaced pairs of bail ears on opposite sides of said tubular body member, expanding said mandrel to expand said member to align its meeting edges in a side seam and to register opposite portions of said body member in engagement with the spaced pairs of positioned ears, welding the side seam to form a tubular can body having a secured side seam and welding said spaced pairs of ears to opposite sides of said body member, each of said welding operations occurring while said body member is maintained in expanded position on the mandrel, whereby to condition said tubular body member for transverse severance into two separate container bodies each having a welded side seam and diametrically oppositely disposed bail ears welded thereto.

JOHN M. HOTHERSALL.